United States Patent [19]
Triet

[11] 3,976,792
[45] Aug. 24, 1976

[54] PROCESS FOR MAKING SHRIMP CHIPS AND RESULTANT PRODUCT

[76] Inventor: Le Minh Triet, 5805 Herbert St., Burke, Va. 22215

[22] Filed: Jan. 29, 1976

[21] Appl. No.: 653,577

[52] U.S. Cl. ............................... 426/52; 426/550; 426/808
[51] Int. Cl.² ........................................ A21D 2/00
[58] Field of Search .................... 426/52, 550, 808

[56] References Cited
UNITED STATES PATENTS

| | | | |
|---|---|---|---|
| 1,926,347 | 9/1933 | Morrow | 426/550 |
| 2,168,246 | 8/1939 | Shepherd | 426/550 |
| 3,282,701 | 11/1966 | Wong et al. | 426/551 |
| 3,297,450 | 1/1967 | Loska | 426/550 |
| 3,698,914 | 10/1972 | Kortschot | 426/550 X |

*Primary Examiner*—Joseph M. Golian
*Attorney, Agent, or Firm*—David H. Semmes

[57] ABSTRACT

A method and a product produced from a combination of comminuted shrimp meat with manioc flour, with the process being characterized in a preferred embodiment by, employing a thin plastic tube to form an intermediate product with better moisture control and product consistency being achieved than previously possible. The process comprises the steps of preparing a paste from an emulsion of shrimp at room temperatures to form a homogeneous paste which is steamed and cooled down according to a particular sequence in order to produce an intermediate product that will expand to form a chip processing an improved overall cellular structure directly benefiting from certain novel process steps as taught hereinafter.

11 Claims, No Drawings

PROCESS FOR MAKING SHRIMP CHIPS AND RESULTANT PRODUCT

BACKGROUND OF THE INVENTION

1. Field of the Invention

This invention relates to a new method for making edible chips which include as a primary constituent comminuted shrimp. According to the particular steps of this inventive process, the shrimp emulsion supplied in a frozen block form is crushed and mixed at room temperature with edible ingredients primarily comprising manioc flour, sugar and yeast in order to produce a paste which may be subsequently treated to form a final dried product which expands into a particularly pallatable end product even though fried in oil at significantly reduced temperatures.

While many processes for preparing chip products from various food constituent elements have been proposed, it has been the general experience in the art that critical mixtures and treatment operations are required as part of the process in order to produce a chip product having a desirable fluffiness when deep fried.

In distinction to prior art processes, the inventive method teaches a particular methodology which departs from the requirement of pre-cooking ingredients and allows for a method of maintaining the product absolutely free from air-borne baterial contamination during the critical steaming and the post-steaming operations. The resultant product produced by the inventive method further disclosed herein surprisingly achieves a particularly pallatable final composition despite basic departures of this method from analogous methods in the prior art.

Therefore, it is an object of this invention to teach a method for producing a puffed shrimp chip product which avoids the disadvantages of the prior art, particularly those inherent in previously considered necessary aspects of steaming and post-steaming operations.

It is a further object of this invention to teach a particular method for producing puffed shrimp chips which results in a final product having particularly improved taste and appearance characteristics as a result of the synergistic effects of the methodology of preparation according to the instant invention.

It is a still further object of this invention to disclose a product produced by this process having none of the disadvantages attendant to expanded chip products made from seafood bases, such as shrimp, which attains a puffed characteristic due to microscopic pockets of air and $CO_2$ which are produced according to the novel method.

2. Description of the Prior Art

The following patents illustrate various prior art methods and products for producing edible chips made from seafood and other protein bases:

| | |
|---|---|
| KORTSCHOT | 3,698,914 |
| WALTER | 3,684,527 |
| CONLEY | 3,512,993 |
| FOX | 3,497,363 |
| LOSKA | 3,297,450 |
| WONG | 3,282,701 |
| ASSELBERGS | 3,201,260 |
| SHEPHERD | 2,168,246 |

While these prior art processes involve preparation of a puffed chip product, the methodologies uniformly taught by these prior art references have noted the requirement of pre-cooking and extended periods of exposure to the air during which baterial contamination is possible.

Exemplary of the prior art is the patent to Conley. In Conley comminuted raw meat, which includes shrimp at col. 3, line 60, is heated to a boiling point and a mixture of 50% potato starch and 50% corn starch is added to form a doughy mass. He states at col. 2, lines 38 et seq. that this first heating is necessary to mix the starch and furthermore that sugar may not be used because the resultant chips when deep fried will have a burned flavor. Furthermore, after forming a roll of the dough it is directly contacted with steam and then exposed to air while drying for 8–12 hours.

In distinction the present method begins with a mixing step done with cold shrimp emulsion at room temperature and significantly the stick is both steamed and chilled, as explained hereafter, without air contamination of the intermediate product before being sliced. The resultant slices are then dried at an elevated temperature of not more than 50°C for not less than 6 hours. As a result the inventive process provides for a unique cellular structure that cannot be derived by the known prior art practices.

The patent to Shepherd, which was considered by the Examiner in issuing the Conley patent, discloses at page 2, line 5 two examples of a mixture; including firstly a quantity of raw shrimp together with an equal quantity of cassava (tapioca) flour. Shepherd additionally requires that cassava flour be absolutely necessary in order to produce his final product. See page 3 lines 45 et seq. It is noted that cassava flour, or tapioca flour, is by dictionary definition part of and including the manioc flour family. Therefore, unlike Conley, Shepherd particularly teaches the importance of manioc flour in his process. Furthermore, Shepherd critically also requires direct steaming of the paste to effect a "gelatinization" with the uncovered loaf being allowed to cool down for 2–6 hours at room temperature and then aged in air for 24 hours before being chilled in a setting room at 16°–20°C. After chilling Shepherd puts the slices in a drying chamber for two hours at 54°–56°C to produce a resultant product having a moisture content of 8–12%.

In distinction, while the present process also uses raw shrimp and cassavatype flour, in one embodiment the intermediate sticks are maintained out of direct contact with the steam and the air during the steaming and refrigerating steps. Again, and importantly, Shepherd requires that his dried slices be fried at a very high oil temperature, approximately 210°C to 220°C for 3 seconds to 30 seconds. In distinction the intermediate product formed by the instant process may be fried at a much lower temperature; approximately 150°C for 10–20 seconds. Therefore, in total, it can be seen that there is a basically different mechanism involved in the preparation of shrimp chips according to the instant process.

The patent to Wong teaches another puffed shrimp product, however, as seen in table I, he uses a very low proportion of shrimp in his mixture. Wong specifically teaches using baking powder unlike these previous references. In this respect we note that our composition also specifies yeast, or baking powder, but the effect of the novel steaming and refrigerating steps and the ingredients is to produce a product different in kind.

Wong at col. 1, line 63 et seq. notes the use of tapioca (or manioc) flour, but necessarily in a combination with wheat flour. Also, at his example 8, and as he explains at col. 3, line 12 et seq., he recognizes that there are certain types of starch which gelatinize in cold water and one can avoid using boiling water in the initial mixing step. Wong also requires egg whites in his composition, as well as what he terms "inert additives" such as shrimp and monosodium glutamate and other preservatives. Importantly, Wong forms his dough into a roll which is directly heated at a steam table, where the low temperature environment necessarily alters the surface moisture content of the dough. Wong further teaches covering his rolls with a damp cloth during a critical cool down period where the moisture content of the roll needs to be carefully regulated. With this methodology, the dough is exposed to air contamination during his steaming and refrigerating operations. Therefore, while there are certain similarities between the instant process and that taught by Wong the composition of the paste taught by Wong cannot be made solely from manioc flour, and the steaming and refrigerating steps differ significantly as to time, temperature and the condition of the dough. These differences, as explained hereafter, result in basic cellular distinctions for the final product.

The patent to Loska at col. 2, line 15 explains his understanding of the phenomenon of "gelatinization" of starch within his process. It is significant that Loska does not employ a meat or shrimp component in his mixture, and at col. 2, line 55 et seq. he teaches that while tapioca (manioc) flour may be used it would only be from 2% to about 6% of the dry mix. Significantly, the product produced by the process of Loska is entirely a starch product with no shrimp or other animal protein component.

The process of Walter is directly contrary to the instant method in that he first cooks clams prior to forming an emulsion using wheat flour. Furthermore, Walter dries the resultant batch produced at the elevated temperature of 200°F which would tend to form bubbles within the mixture and clearly does not allow water to diffuse from the stick. By contrast, in the instant process drying must be for no less than 6 hours at temperatures below 50°C so that water diffuses to the surface to produce a resultant intermediate product having a maximum moisture level of 12%. Again, Walter does not teach a method equivalent to the instant method; Walter's product must also be fried at a very high temperature of 475°F in order to produce the necessary expansion of his product. Additionally, Walter does not use or recognize any criticality to employing yeast or baking powder in his formulation. As taught herein a unique cellular structure results from the effect of moistureless cooking and refrigeration upon a dough that contains a yeast component.

Asselbergs merely relates to a potato and fish composition which is disintegrated into crystals and is without further relevance to the product or the process of this instant invention.

Similarly, the freeze dried meat product and process taught by Foy is only pertinent and illuminating of the instant invention insofar as he notes that certain parameters of his process are critical to ensure the final product.

Finally, Kortschot is pertinent insofar as his process illustrates the significant and unexpected interdependence that moisture content, mixing formula and other factors have on the final form of a chip product. Again, it is significant that this reference recognizes the difficulty of porosity and texture control in chip products generally.

SUMMARY OF THE INVENTION

The process according to the instant invention differs from the prior art in the significant fact that the particular steps of the preparation of the final dried product cooperate in an unexpected fashion in order to produce an intermediate product that is not subject to bacterial contamination and moisture variations during a steaming and refrigerating sequence.

According to the preferred embodiment, the paste is comprised primarily of cold water, manioc flour and comminuted shrimp meat with the paste further comprising sugar, egg and yeast as essential elements of the initial paste.

Unlike limitations in prior art methods of making puffed products of flour and seafood, such as shrimp according to the method taught herein, there is no prohibition of using sugar within the paste combination because the cooperation of steps according to this method allows for a frying and resultant puffing of the final product which will not result in charing of sugar or other constituent elements of the dried product.

A further significant aspect of the invention is the requirement of yeast to cooperate with the other constituent elements in order to produce the final puffed product without reliance upon extremely high frying temperatures.

One important step according to this instant invention is first forming individual chips, and drying them for at least 6 hours at a temperature of less than 50°C in order to first allow water diffusion to create an intercellular structure. The final intermediate product has a moisture content in the range of approximately 8–12% by weight. Unlike prior art processes as hereinbefore discussed, the drying step cannot be accomplished at elevated temperatures and still obtain the slow diffusion of the water without localized bubbling within the dough. Bubbles would result from discrete vaporization of the entrained water within the mass.

Further features, objects and advantages of the process of the instant invention and the resultant product produced by that process will become more apparent with reference to the following detailed description.

DESCRIPTION OF THE PREFERRED EMBODIMENTS

The initial step in preparing a shrimp chip according to the process involves preparing an emulsion from small shrimp which is conventionally supplied in a frozen block. According to the first step of this invention, an emulsion is prepared by crushing the block of shrimp in an ice crusher or equivalent device and thereafter mixing and comminuting the crushed shrimp pieces in a grinder. During this emulsion step a part of the total percentage of water involved in the mixture may be added to simplify the mixing/comminuting if desired.

The comminuted shrimp is then an ingredient for the preparation of a cold paste which essentially comprises this emulsion and includes the following components, by approximate unit weight relationship:

| | |
|---|---|
| Cold Water | 2.000 |
| Manioc Flour | 1.000 |

-continued

| | |
|---|---|
| Comminuted Shrimp Meat | 0.500 |
| Sugar | 0.200 |
| Egg | 0.080 |
| Yeast | 0.002 |

This paste may further preferably include the following additional components, by approximate unit weight relationship:

| | |
|---|---|
| Salt | 0.080 |
| Fish Sauce | 0.040 |
| Monosodium Glutamate | 0.010 |

The paste is prepared by combining in a mixer the basic components until the mixture is in the form of a slurry. The mixed slurry is then further kneaded in a conventional kneading machine until the entire paste is homogeneous. The kneading operation is also done at room temperature so that the entire steps to this point do not involve a pre-cooking or temperature sensitive change in the basic ingredients forming this initial paste composition.

The kneaded cold paste is according to a preferred embodiment then fed to a stuffing device which forms the paste into a device such as a nylon tube having an approximate diameter of 3 cm and a length of approximately 50 cm. According to this preferred embodiment, this stuffed nylon tube is then wrapped tightly with a cloth previous to a steaming step.

The steaming step is done at ambient pressure employing live steam so that the covered sticks are steamed for approximately 40 minutes at a temperature within the range of 100°C to 130°C. Therefore, critically, the dough mass is not in surface contact with the moisture produced by any condensing steam. Rather, the dough is positively sealed within the nylon tube and remains unaffected by bacteria or other external air conditions. Because the tube is very thin gauge nylon, or equivalent plastic films, the moisture level within the dough mass is maintained constant during the steaming and subsequent refrigeration steps. Therefore, there is positively no water loss, either by surface evaporation or intercellular diffusion, until the dough is released from this plastic tube.

Next, only the cloth is removed and the tubes are allowed to cool within a refrigerated environment of approximately 0°C for approximately 24 hours. During this step it is important to note that the paste solidifies to allow cutting, but without any moisture loss or bacterial contamination of the dough as maintained sealed in the tubes.

The first drying step is subsequent to the slicing of the sticks into chips of approximately 2–3 mm. The plastic tube is removed immediately before slicing to prevent any water diffusion from the interior of the dough while still in a stick form.

The thusly formed slices are then dried for a minimum of six hours at a temperature which is maintained from room temperature to less than 50°C. This critical drying step will first allow water to diffuse from within the individual slices outwardly without forming bubbles or other discontinuities within the structure of the chip. A drying is maintained for at least six hours at this temperature below 50°C in order to produce a moisture content in each chip of between 8–12% by weight. As part of this drying step, the chips may first be pre-dried without incurring an uneven drying by first simply drying the outside of the slices by passing them through a hot air tunnel maintained at 60°–70°C for 5 to 10 minutes. However this pre-drying step is of very short duration so that the unwanted bubbling effect inherent at elevated temperature drying is not present. The diffusion drying step may be done continuously for 8–10 hours at temperatures of up to 50°C or alternatively for a first 3 hour drying at temperatures up to 50°C followed by a 4 hour interruption with the individual chips being removed from the drying chamber and allowed to remain at room temperature. Following this interruption the chips may be again loaded into the drying chamber for a second three hour drying at a temperature of up to 50°C. Whether the consecutive or the interrupted drying sequences is followed the desired final moisture content within each chip is from 8–12%. Upon the attainment of this moisture level, the chips are stored, if necessary, in an air-tight container so that the moisture content will not significantly vary if the thusly produced final intermediate product is not to be immediately fried.

The final frying step involves using either fat or vegetable oil which is maintained at a temperature of between 150°–180°C. As has been explained, the previous method steps necessarily require yeast or baking powder and manioc flour. Critically, no water is allowed to diffuse during steaming and refrigerating, and the resultant cellular structure of the dried chips is believed to include microscopic pockets of both air and carbon dioxide. It is believed that because of the absolute moisture control during steaming and refrigerating herein microscopic voids form uniformly within the finally dried chips. The chips do not require a substantially elevated frying oil temperature in order to puff. The dried chips will puff to a fluffy product having a volume at least 2–3 times as great as the initial volume of the finally dried intermediate product. As has been noted, the use of sugar and other carbohydrate elements within this combination does not produce a burned texture or flavor to these chips, and frying may be at temperature as low as 150°C. Therefore, prior art prohibitions against using sugar and related carbohydrates are not present according to the product and process taught by the instant invention.

The dried chips are fried for 10 to 20 seconds according to the previously determined thickness of each individual chip and then removed from the oil bath for the final step of the process. The hot chips are then passed through a roller device in order to both flatten the chips and remove excess oil from the structure. In this respect the final product does not contain the amount of oil which is absorbed during the relatively lower temperature oil frying operation. Rather, from the flattening and oil absorbing operation the chip is significantly less greasy and more pallatable than prior art chips which are not subjected to such a final flattening and oil absorption step.

While the formulation of the paste into a stick for the subsequent steaming cooling and drying operations is a preferred embodiment, it has further been discovered that the paste prepared in the mixing and kneading step may alternatively be scraped upon a plastic or other type of non-adhering surface to form a continuous layer of dough on the top surface of the non-adhering belt. According to this second embodiment the thusly formed thin paste layer may be passed through a steaming tunnel for 5 to 7 minutes at a temperature of from 80°–100°C as adjusted according to thickness. The steamed dough must then be immediately passed under air jets, aimed downwardly and perpendicular to the plastic belt, in order to remove condensed steam from the film. This step is accomplished quickly and is necessary to dry the surface of the condensed water. It has been found to require less than a minute and the normally directed air jets press the dough securely onto the top surface of the belt.

The dough layer is then removed from its non-adhering support belt structure and formed to produce a sheet which may be pre-dried in a second forced air tunnel for 5 to 7 minutes at a slightly elevated temperature of 60°–70°C. This rapid pre-drying step again only effects surface water on the film and has been found to assist a subsequent cutting step. The pre-dried film is then cut into desired shapes with a conventional cutter and then dried for a minimum of at least six hours at a temperature less than 50°C in order to produce in the cut forms a moisture content within each form of approximately −12% by weight. According to the second embodiment, the drying step is also critically done for no less than six hours in order to allow diffusion of the water from within the intercellular structure of the mass outward without producing localized voids.

With the second embodiment the frying is again also advantageously done in oil which is maintained at a temperature of between 150°–180°C for approximately 10–20 seconds as depending upon the thickness of the cut shapes. Finally, the thusly expanded hot shrimp chip shapes are flattened to expell excess oil from the puffed structure in order to produce the final puffed product having a fluffy texture without excess oiliness.

While two embodiments of the process and the produce produced thereby have been particularly explained herein, applicant's invention is to be limited solely by the appended claims.

I claim:

1. A process for preparation of a shrimp containing foodstuff comprising the steps of:
A. preparing an emulsion comprising crushing a block of frozen shrimp and comminuting to form an emulsion;
B. preparing a cold paste comprising said emulsion and including the following components, by approximate unit weight relationship:

| | |
|---|---|
| Cold Water | 2.000 |
| Manioc Flour | 1.000 |
| Comminuted Shrimp Meat | 0.500 |
| Sugar | 0.200 |
| Yeast | 0.002 |
| Egg | 0.080 |

C. kneading said cold paste at room temperature until homogeneous, forming said paste into a stick and completely covering said stick by a thin water-impervious material;
D. steaming said covered sticks for approximately 40 minutes at a temperature of from 100°C to 130°C;
E. cooling said covered sticks at a temperature of approximately 0°C for approximately 24 hours;
F. unwrapping said covered sticks and cutting said sticks into slices;
G. drying said slices for at least 6 hours at a temperature up to 50°C to produce moisture content in each slice of approximately 8–12% by weight;
H. frying said dried slices for approximately from 10–20 seconds in heated oil, said heated oil being maintained at a temperature between 150°C and 180°C; and
I. flattening the hot slices and removing excess oil.

2. A process according to claim 1, wherein said drying step further comprises:
i. pre-drying by passing said slices through a hot air tunnel maintained at 60°C to 70°C for approximately 5 to 10 minutes; and
ii. further drying said slices for two 3 hour intervals at 50°C, said intervals separated by a 4 hour interruption at room temperature.

3. A process according to claim 1, wherein said paste further includes the following additional components, by approximate unit weight relationship:

| | |
|---|---|
| Salt | 0.080 |
| Fish Sauce | 0.040 |
| Monosodium Glutamate | 0.010 |

4. A process according to claim 1, wherein said water impervious covering material comprises stuffing said paste into a nylon tube, sealing said tube, and wrapping said covered stick tightly with a cloth.

5. A process according to claim 4, wherein said cooling step further comprises unwrapping said cloth and cooling said nylon tube down prior to refrigerating at approximately 0°C for approximately 24 hours.

6. A process according to claim 1, wherein said step of cutting includes forming slices approximately 2–3 mm thick.

7. A process for preparation of a shrimp containing foodstuff comprising the steps of:
A. preparing an emulsion comprising crushing a block of frozen shrimp and comminuting to form an emulsion;
B. preparing a cold paste comprising said emulsion and including the following components, by approximate unit weight relationship:

| | |
|---|---|
| Cold Water | 2.000 |
| Manioc Flour | 1.000 |
| Comminuted Shrimp Meat | 0.500 |
| Sugar | 0.200 |
| Egg | 0.080 |
| Yeast | 0.002 |

C. mixing said paste at room temperature until homogeneous, scraping said paste as a thin layer onto a continuous belt having a non-adhering surface;
D. passing said layer through a steaming tunnel for approximately 5–7 minutes at a temperature of 80°–100°C;
E. immediately blowing condensed water off the surface of said layer with ambient air directed normally thereupon;
F. cutting said dried film into individual shapes;
G. drying said slices for at least 6 hours at a temperature less than 50°C to produce moisture content in each slice of approximately 8–12% by weight;
H. frying said dried slices for approximately from 10–20 seconds in heated oil, said heated oil being maintained at a temperature between 150°C and 180°C; and
I. flattening the hot shapes and removing excess oil.

8. The product produced by the process of claim 1.

9. The product produced by the process of claim 3.

10. The product produced by the process of claim 7.

11. The process according to claim 7, wherein said paste further includes the following additional components, by approximate unit weight relationship:

| | |
|---|---|
| Salt | 0.080 |
| Fish Sauce | 0.040 |
| Monosodium Glutamate | 0.010. |

* * * * *